United States Patent [19]
Kobayashi et al.

[11] 3,816,368
[45] June 11, 1974

[54] FILM OF A POLYETHYLENE-1,2-DIPHENOXY-ETHANE-4,4'-DICARBOXYLATE COPOLYMER

[75] Inventors: Hidehiko Kobayashi; Kiichiro Sasaguri, both of Tokyo, Japan

[73] Assignee: Asahi Kasei Kogyo Kabushiki Kaisha, Osaka, Japan

[22] Filed: Aug. 20, 1971

[21] Appl. No.: 173,684

[52] U.S. Cl. ............ 260/47 C, 161/165, 260/40 R, 264/289
[51] Int. Cl. ............................................ C08g 17/14
[58] Field of Search .................... 260/47 C; 264/289

[56] References Cited
UNITED STATES PATENTS
3,574,046  4/1971  Buteux ............................... 161/165
3,595,736  7/1971  Buteux ............................... 161/165

*Primary Examiner*—Lester L. Lee
*Attorney, Agent, or Firm*—Cooper, Dunham, Clark, Griffin & Moran

[57] ABSTRACT

Films from a polyethylene-1,2-diphenoxyethane-4,4'-dicarboxylate copolymer with a comonomer selected from the group consisting of glycols other than ethylene glycol and dicarboxylic acid other than 1,2-bis(P-carboxyphenoxy) ethane contained in a proportion from one to 10 mole percent which have outstanding unidirectional characteristics, said film having in the direction of extrusion a tensile breaking strength from 1,800 to 3,500 kg./cm.$^2$, a tensile breaking elongation from 10 to 30 percent and a modulus of tensile elasticity from 57,000 to 100,000 kg./cm.$^2$ and method for the preparation of the same which comprises stretching a substantially amorphous film from said copolymer at a temperature from 70° to 200°C. either simultaneously or successively in the direction of extrusion and in a direction rectangular thereto to a stretch ratio of from 3.0 to 5.0 in the former direction and a stretch ratio of from 1.5 to 3.0 in the latter direction and heat-setting the film thus stretched anisotropically along the two axes at a temperature from 150° to 220°C. are disclosed.

3 Claims, No Drawings

FILM OF A POLYETHYLENE-1,2-DIPHENOXY-ETHANE-4,4'-DICARBOXYLATE COPOLYMER

BACKGROUND OF THE INVENTION

1. Field of the Invention

This invention relates to novel oriented polyester-ether films and methods for the production of the same. More particularly, it is concerned with films from polyethylene-1, 2-diphenoxyethane-4,4'-dicarboxylate copolymers having outstanding unidirectional characteristics, polyester-ether films having excellent mechanical properties such as a high Young's modulus and high strength, good insulation and excellent dimensional stability.

2. Description of the Prior Art

Polyethylene-1,2-diphenoxyethane-4,4'-dicarboxylates are characterized by their extremely high rate of crystallization. Amorphous polyethylene-1,2-diphenoxyethane-4,4'-dicarboxylate starts to crystallize at 74°C. on heating. Its second order transition temperature is 70°C. As a result, the polymer has been considered extremely difficult to stretch since the optimum stretching temperature is in a narrow range from 70° to 74°C. In practice, it has been found that, when heat-stretched, it tends to crystallize by heating with the result that there is deterioration in stretchability as well as increased thickness. The phenomenon is especially noted at temperatures above 85°C. and, when subjected to anisotropic stretching. The difficulties so affect the product that unevenness of stretching and reduction of stretchability result.

It has now been found that uniform anisotropic stretching can be effected while overcoming the disadvantages of the prior art as described above by using as the base material specific polyethylene-1,2-diphenoxyethane-4,4'-dicarboxylate copolymers with a third component which is a glycol or dicarboxylic acid of different kind present in an amount from one to 10 mole percent based on the starting glycol or dicarboxylic acid component. If the content of the third component exceeds 10 mole percent it will reduce resistance to heat to a melting point below 240°C.

This invention provides films with improved properties from polyethylene-1,2-diphenoxyethane-4,4'-dicarboxylate copolymers, particularly improved dimensional stability and methods for the preparation of the same by stretching a substantially amorphous film obtained from a polyethlene-1,2-diphenoxyethane-4,4'-dicarboxylate copolymer containing as a third component a glycol other than ethylene glycol or a dicarboxylic acid other than 1,2-bis(p-carboxyphenoxy)ethane in a proportion from one to 10 mole percent at a temperature in the range from 70°C. to 200°C., first in the direction of extrusion to a stretch ratio of from 3 to 5 and then in the direction rectangular to the direction of extrusion to a stretch ratio of from 1.5 to 3 or, if necessary, simultaneously in these two directions.

Alternatively, the stretching in the direction of extrusion may be conducted in two stages, that is, after the initial stretching in the two directions, the second stretching in the direction of extrusion may be made to the final stretch ratio set forth above. The film stretched as described as above may be heat-set at a temperature from about 150 to 220°C. if desired. However, a special feature of the invention is the fact that, without the heat-set, films of relatively low thermal shrinkage can be produced. Dimensional stability may be further increased by carrying out the stretching in both directions at a temperature from 110° to 200°C.

There are produced in carrying out the method of this invention polyethylene-1,2-diphenoxyethane-4,4'-dicarboxylate copolymer films which have such excellent unidirectional characteristics as, in the direction of extrusion, a tensile breaking strength from 1,800 to 3,500 kg./cm.$^2$, a tensile breaking elongation from 10 to 30 percent and a modulus of tensile elasticity from 57,000 to 100,000 kg./cm.$^2$. Films with such outstanding unidirectional characteristics have long been desired for the production of magnetic tape, recording tape, metal yarn and various other types of tapes.

DESCRIPTION OF THE INVENTION

The starting polymer used in carrying out the present invention is a polyethylene-1,2-diphenoxyethane-4,4'-dicarboxylate copolymer.

The copolymer is produced during the condensation reaction of ethylene glycol with 1,2-bis(p-carboxyphenoxy)ethane or an ester exchange reaction of ethylene glycol with an ester-forming derivative of 1,2-bis(p-carboxyphenoxy)ethane such as, for example, 1,2-bis-(p-carbomethocyphenoxy)ethane or in condensation reaction of the ester exchange reaction product, by copolymerization with from one to 10 mole percent of a glycol other than ethylene glycol or a dicarboxylic acid other than 1,2-bis(p-carboxyphenoxy)ethane.

Comonomers useful in carrying out the method of this invention include one or more glycols selected from the group consisting of propylene glycol, diethylene glycol, triethylene glycol, tetramethylene glycol and the like or one or more dicarboxylic acids selected from the group consisting of terephthalic acid, isophthalic acid, phthalic acid, bi-benzoic acid, adipic acid, sebacic acid, hexahydroterephthalic acid, naphthalenedicarboxylic acid and the like.

The above-mentioned comonomer is added to the reaction system while conducting the polymerization to from the polyethylene-1,2-di-phenoxyethane-4,4'-dicarboxylate. The amount of comonomer contained in the resulting polymer is determined by gas chromatograph following depolymerization of the resulting copolymer in methanol. More specifically, 5 g. of methanol and 0.03 g. of sodium carbonate are added to 1 g. of the copolymer and the mixture is heated in an ampule at 160°C. for 3 hours; the decomposition product is analyzed by a Shimazu 3AF gas chromatograph.

In carrying out the present invention the polyethylene-1,2-diphenoxyethane-4,4'-dicarboxylate copolymer is melted and extruded, and then quenched at a temperature below 70°C. to afford a substantially amorphous film of the polymer. The film of the invention is produced from the original amorphous film material by subjecting it to stretching in the temperature and stretch ratio ranges specified hereinabove. Such stretching may be effected simultaneously in the two directions, or first in the direction of extrusion and successively in the rectangular direction or, in addition, in the direction of extrusion.

The temperature at which the stretching is applied is in the range from 70° to 200°C. Feasibility of the stretching at a temperature above 100°C. is characteristic of the copolymer of this invention, quite unlike polyethylene terephthalate. Stretching at a temperature below 70°C. will result in such undesirable properties as necking and void formation within the film. On the other hand, stretching at a lower temperature range from 70° to 90°C. in the direction of extrusion and at a higher one from 90° to 200°C. in the rectangular direction enables production of films with superior dimensional stability and mechanical properties.

In carrying out the invention the substantially amorphous film is made anisotropic by stretching, either simultaneously or successively, in the direction of extrusion to a stretch ratio from 3.5 to 5.0 and in a rectangular direction to a stretch ratio from 1.5 to 3. One of the outstanding and unexpected features of the present invention is the fact that the anisotropic stretching gives rise to marked improvement in dimensional stability as well as reduction of thermal shrinkage. In other words, there is produced without heat treatment a film with low thermal shrinkage and good dimensional stability in one direction. Heatsetting of the film at a temperature from 150° to 220°C. further stabilizes it and result in a further improvement in dimensional stability. A further characteristic to be noted is that there is no reduction of thermal shrinkage in the direction rectangular to the direction of extrusion despite the remarkable reduction of the thermal shrinkage in the latter direction, thereby affording a unique film with unidirectional shrinkage properties and excellent mechanical properties.

An important feature of this invention lies in provision of films with outstanding unidirectional characteristics (in the direction of extrusion) from a polyethylene-1,2-diphenoxyethane-4,4'-dicarboxylate copolymer which have a far higher tensile breaking strength, unexpectedly higher modulus of tensile elasticity and lower elongation than the balanced (uniformly stretched in two directions) films. The films are very useful as the support bases for magnetic and recording tapes, inductors in a wide range of electric applications such as the insulating material for the electric motors, transformers, wire cables, accumulators and the like, as well as for plastic polishing materials, transparent containers, pipes and stoppers for bottles, fillers as well as the metal yarns, various other kinds of tapes, and the like.

A variety of additives such as, for example, a filler composed of a finely divided material, dye, light stabilizer and antistatic agent may be added to the copolymer in carrying out the present invention. Illustrative fillers suitable for the use are titanium dioxide, aluminium silicate, silicates such as clay, pulverized glass, abrasives such as silicone carbide and decorative materials such as talc and pulverized mica.

DESCRIPTION OF PREFERRED EMBODIMENTS

The following examples are illustrative of preferred embodiments of the invention, but it is not intended to limit the invention thereto.

EXAMPLE 1.

1,2-bis(p-carboxyphenoxy)ethane (p-carboxyphenoxy)ethane and ethylene oxide were reacted and the reaction product purifed by recrystallization from dichlorethane. The 1,2-bis-[p-($\beta$-hydroxycarbethoxy)-phenoxy]ethane thus obtained was condensed to give polyethylene-1,2-diphenoxyethane-4,4'-dicarboxylate. The polymer was extruded at 280°C. onto a cast roll cooled to 60°C. to prepare a substantially amorphous film.

Amorphous films were prepared in the same way as above except the adipic acid was added in a predetermined portion on the basis of 1,2-bis-(p-carboxyphenoxy)ethane followed by copolymerization.

The films thus obtained, 300 $\mu$ in thickness, 10 cm. × 10 cm., were preheated at 100°C. and stretched on a biaxis stretching apparatus (Iwamoto Seisakusho) successively in the directions of lengthwise and breadthwise axes, 3.5 times lengthwise and 2.5 times breadthwise. Table 1 shows behaviours after the anisotropic stretching.

Table 1

| Proportion of adipic acid in the copolymer | Crystallization | Stretched state | Evenness in thickness* | Melting point |
|---|---|---|---|---|
| — | Turbid | Cut in notch | — | 251°C. |
| 0.5 mol.% | Cloudy | Stretchable | 45 | |
| 1 | Slightly cloudy | Stretchable | 20 | |
| 5 | Clear | Good | 11 | |
| 10 | Clear | Good | 11 | 239°C. |
| 15 | Clear | Good | 15 | 234°C. |

*Evenness in thickness is expressed as the difference between the maximum and minimum thickness of the stretched film.

As shown in Table 1, polyethylene-1,2-diphenoxyethane-4,4'-dicarboxylate, which has a high rate of crystallization, is barely stretchable at all. On the contrary, copolymerization with more than 1 mole percent of adipic acid results in films which are susceptible to uniform stretching. With adipic acid added in a proportion of 10 mole percent, melting point of the product is 239°C. with reduction of thermal resistance.

EXAMPLE 2.

A polyethylene-1,2-diphenoxyethane-4,4'-dicarboxylate copolymer containing diethylene glycol in aproportion of three mole percent on the basis of ethylene glycol was melted at 280°C. and extruded onto a cast roll cooled to 60°C. to prepare a substantially amorphous film (400 $\mu$). The film was subjected simultaneously to anisotropic stretching at 85°C. on a biaxis stretching apparatus to the stretch ratios shown in Table 2. Physical properties of the resulting films are shown in Table 2 wherein stretch ratios in the direction rectangular to the direction of extrusion were varied with a constant stretch ratio of 3.1 in the direction of extrusion.

Table 2

| Physical properties in the direction of extrusion | Stretch ratio in the direction rectangular | | | | |
|---|---|---|---|---|---|
| | 1.3 | 1.5 | 2.0 | 2.7 | 3.1 |
| Tensile strength (kg./cm.$^2$) | 1700 | 1850 | 1920 | 1900 | 1950 |
| Tensile elongation (%) | 25 | 26 | 26 | 27 | 32 |
| Modulus of tensile elasticity (kg./cm.$^2$) | 62,500 | 61,500 | 61,200 | 61,000 | 60,400 |
| Thermal shrinkage after treatment at 160°C. for 10 min.(%) | 8 | 11 | 11 | 12 | 13 |
| Evenness in thickness ($\mu$) | 35 | 13 | 12 | 10 | 10 |

As shown in the table, the stretched films have low thermal shrinkages without setting by heat treatment and, at a stretch ratio below 1.5, the film is excellent in evenness in thickness.

EXAMPLE 3.

A polyethylene-1,2-diphenoxyethane-4,4'-dicarboxylate copolymer containing 5 mole percent of phthalic acid was extruded at 285°C. through a T die onto a cast roll cooled to 70°C. on which it was stretched between a faster roller and a slower roller to a stretch ratio of 3.5 while heating at about 85°C. with an infra-red heater. It was then stretched in the direction rectangular to the direction of extrusion to a stretch ratio of 2.7 at temperatures shown in table 3 and wound. The mechanical properties of the resulting films are shown in the table.

Table 3

| Stretching temperature (°C.) | 110 | 130 | 150 | 190 |
|---|---|---|---|---|
| Tensile strength in the direction of extrusion (kg./cm.$^2$) | 2050 | 2300 | 2400 | 2450 |
| Tensile elongation in the direction of extrusion (%) | 25 | 22 | 18 | 15 |
| Modulus of tensile elasticity in the direction of extusion (kg./cm.$^2$) | 61500 | 62000 | 63000 | 65000 |
| Shrinkage in the direction of extrusion (%) | 15 | 8 | 3 | 1 |
| Shrinkage in the direction rectangular to the direction of extrusion (%) | 48 | 42 | 38 | 32 |

EXAMPLE 4.

A polyethylene-1,2-diphenoxyethane-4,4'-dicarboxylate copolymer (copolymerized with adipic acid in a proportion of 5 mole percent) was extruded at 280°C. and quenched to 150°C. Prior to stretching at 110°C. in the direction of extrusion and the direction rectangular thereto to a stretch ratio of 2.5, the film was stretched between a slower roller and a faster roller at 95°C. to stretch ratios shown in Table 4. The mechanical properties of the resulting films are shown in the table.

Table 4

| | Stretch ratio in the direction of extrusion | | | |
|---|---|---|---|---|
| | 2.7 | 3.0 | 4.0 | 4.7 |
| Tensile strength in the direction of extrusion (kg./cm.$^2$) | 1600 | 1900 | 2500 | 2900 |
| Tensile elongation in the direction of extrusion (%) | 31 | 27 | 18 | 15 |
| Modulus of tensile elasticity in the direction of extrusion(kg./cm.$^2$) | 54,000 | 61,000 | 66,000 | 75,000 |
| Shrinkage in the direction of extrusion (%) | 16 | 14 | 10 | 7 |
| Shrinkage in the direction rectangular to the direction of extrusion (%) | 45 | 40 | 36 | 31 |

EXAMPLE 5.

An amorphous film obtained as in Example 4 was stretched first between a slower roller and a faster roller at 90°C. in the direction of extrusion to a stretch ratio of 3 and then on a lengthwise and breadthwise stretching apparatus to a stretch ratio of 2.8.

The stretched film was further stretched at 180°C. along the direction of extrusion to a stretch ratio of 1.5 and, prior to being wound, heat-set by crystallization at 210°C. The resulting film had the following properties in the direction of extrusion:

Breaking strength, 2,800 kg./cm.$^2$;
Breaking elongation, 12 percent;
Modulus of tensile elasticity, 75000 kg./cm.$^2$;
Shrinkage on holding at 160°C. for 10 minutes, in the direction of extrusion, 1.2 percent;
in the direction rectangular thereto, 21 percent.

We claim:

1. A film from a copolymer obtained by reacting a mixture comprising (1) a member selected from the group consisting of ethylene oxide and ethylene glycol, (2) 1,2-bis-(p-carboxyphenoxy)ethane ethane and (3) a comonomer member selected from the group consisting of propylene glycol, diethylene glycol, triethylene glycol, and tetramethylene glycol which is present in a proportion from 1 to 10 mole precent based on ethylene oxide or ethylene glycol or a member selected from the group consisting of terephthalic acid, isophthalic acid, phthalic acid, bi-benzoic acid, adipic acid, sebacic acid, hexahydroterephthalic acid, and naphthalenedicarboxylic acid which is present in a proportion from 1 to 10 mole precent based on 1,2-bis-(p-carboxyphenoxy)ethane, which has outstanding unidirectional characteristics, said film having in the direction of extrusion a tensile breaking strength from 1800 to 3500 kg./cm.$^2$, a tensile breaking elongation from 10 to 30 percent and a modulus of tensile elasticity from 57,000 to 100,000 kg./cm.$^2$.

2. A film as in claim 1 which exerts thermal shrinkage below 15 percent in the direction of extrusion and thermal shrinkage from 20 to 80 percent in the direction rectangular to the former direction.

3. A film according to claim 1 wherein the comonomer is a member selected from the group consisting of phthalic acid, isophthalic acid, adipic acid, propylene glycol and diethylene glycol.

* * * * *